United States Patent Office 3,557,636
Patented Jan. 26, 1971

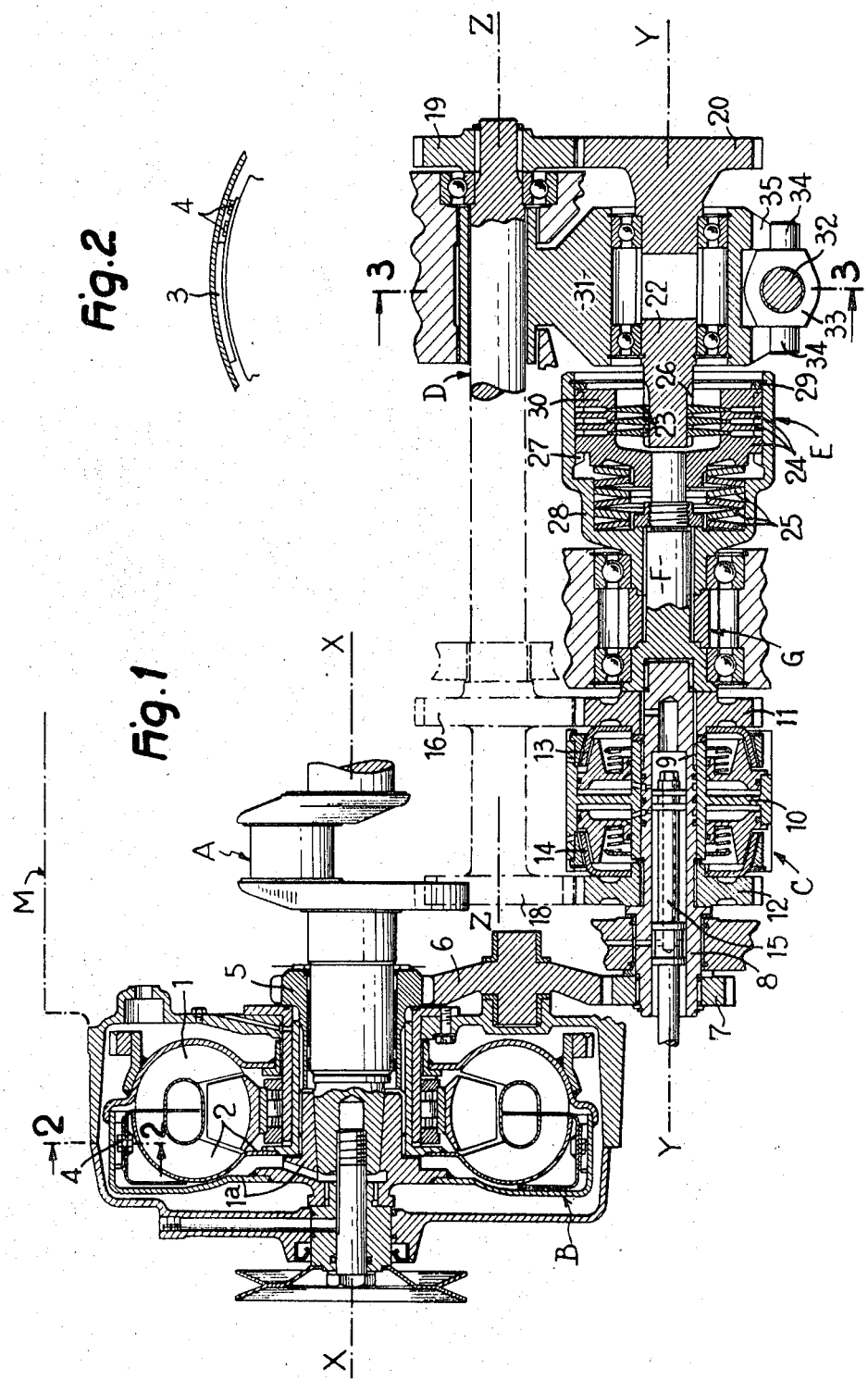

3,557,636
TRANSMISSION FOR AN AUTOMOBILE VEHICLE OR THE LIKE
Marcel Dangauthier, Paris, France, assignor to Societe Industrielle et Commerciale des Automobiles Peugeot, Paris, France, a French body corporate
Continuation of application Ser. No. 656,832, July 28, 1967. This application May 27, 1969, Ser. No. 830,208
Int. Cl. F16h *15/08, 15/16, 47/06*
U.S. Cl. 74—732
15 Claims

ABSTRACT OF THE DISCLOSURE

A transmission between a driving input shaft and a driven output shaft, comprising, in series relation, a hydrokinetic converter and a variator affording a continuous variation of the transmission ratio.

CROSS-REFERENCE TO RELATED APPLICATIONS

This application is a continuation of my copending application Ser. No. 656,832, now abandoned, filed July 28, 1967.

The present invention relates to transmissions for automobile vehicles or the like and in particular to devices comprising a drive unit disposed transversely of the direction of travel of the vehicle.

The object of the invention is to provide a transmission comprising in series relation between the input drive shaft and output driven shaft a hydrokinetic converter and a variator affording a continuous variation of the transmission ration.

The gearing down obtained is equal at each instant to the product of the gearing downs due to the converter and to the variator.

Owing to the combination of the hydrokinetic converter and variator, the range of gearing down of the variator can be limited (for example 0.55 to 1), the rest of the gearing down being achieved by the conversion ratio of the converter. Further, when moving off, the converter affords its flexibility and gearing down. Furthermore, any sudden variation in the torque and any irregularity in the driven torque is "filtered" by the hydrokinetic converter so that the life of the variator is prolonged and the variator can be operated closer to its limit characteristics (gain as concerns life and size, etc.).

According to another feature, means are provided for by-passing the hydrokinetic converter at the high engine speeds by causing the turbine to rotate with the pump of said converter, this being possible owing to the location of the continuous-variation variator after the converter, this being achieved without producing noticeable shocks when interconnecting the turbine and the pump associated with increased efficiency at high speeds.

Further features and advantages of the invention will be apparent from the ensuing description with reference to the accompanying drawings.

In the drawings:

FIG. 1 is a longitudinal sectional view of a transmission according to the invention employed in a vehicle having a transverse drive unit;

FIG. 2 is a sectional view taken along line 2—2 of FIG. 1;

Figure 5:
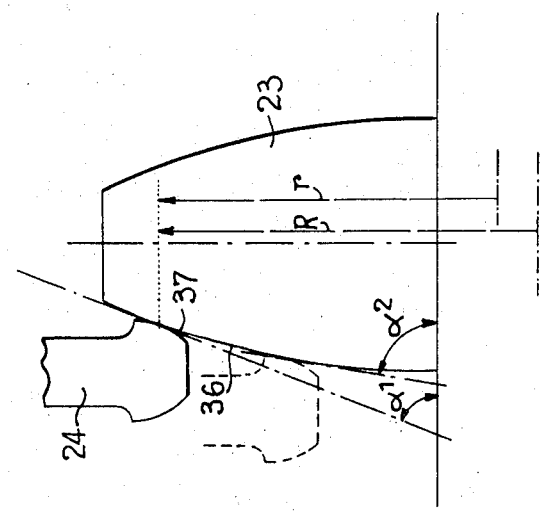
FIG. 5 is a diagrammatic detail view concerning the variator.

In the illustrated embodiment, the transmission according to the invention comprises, in combination with the crankshaft A of a drive unit M, a hydrokinetic converter B which drives, through a reversing device C, an intermediate shaft D, the latter driving, through a continuous-variator E, an output shaft F on which is keyed, for example, the gear pinion G of the differential of the vehicle.

It can be seen that the converter B and the variator E are in series relation.

The assembly is so positioned that the reversing device C and the variator E are disposed on a common axis Y—Y, this axis being parallel to the axis X—X of the crankshaft A of the converter B and to the axis Z—Z of the intermediate shaft D.

The hydrokinetic converter B is mounted at the end of the crankshaft A. It comprises a pump element 1 which is fixed to the end of the crankshaft A by means of the pump body 1a, and a turbine element 2. Disposed between the elements 1 and 2 is a device for interconnecting the elements under the action of centrifugal force. This device comprises small plates or pads 3 located adjacent the periphery of the converter and connected to the turbine element 2 for example by bolts 4 (FIGS. 1 and 2). Thus it is possible to interconnect the two elements for a given speed of rotation of the turbine element 2.

Figure 4:
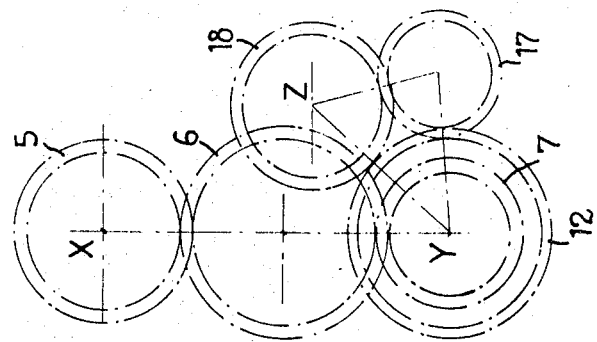
FIG. 4 is a side elevational view of the gear elements of the transmission, showing how these elements are intermeshed.

The turbine element 2 drives, through a gear train of three gears 5, 6, 7 (FIGS. 1 and 4), a shaft 8 on which are machined splines 9 driving the hub 10 of a reversing device C. Two freely rotatable gears 11 and 12 are mounted on the shaft 8, these gears being capable of being interconnected as concerns rotation with the shaft 8 through clutches 13 and 14 which are hydraulically controlled by a distributor slide valve 15 coaxial with the shaft 8. The cones of the clutches are integral with the gears 11 and 12.

The gear 11 directly drives a gear 16 of the shaft D whereas the gear 12 drives an idler gear 17 (FIG. 4) which is meshed with a gear 18 of the shaft D. Thus it is possible to cause the shaft D to rotate in both directions which affords the ratios of the forward travel and the ratios of the reverse travel.

The intermediate shaft D transmits, through gears 19 and 20, its rotation to the input shaft 22 of the variator E of known type having internal discs. The variator comprises a number of male conical discs 23 which are gripped between female conical rings 24 through, for example, an assembly of Belleville washers 25. Note that other devices, associating springs and a ramp, can be incorporated which enables an axial force which is a function of the torque exerted through the variator to be furnished. The discs 23 are axially slidable on the shaft 22 and are driven in rotation by splines 26 formed on this shaft. The discs or rings 24 are axially slidable along splines 27 formed in the receiving socket 28 and their lateral movement is limited by a ring 29 or any other suitable means which determines the extreme axial position of the disc 30. The socket 28 drives the gear of the differential G in rotation through the splined shaft F.

Figure 3:
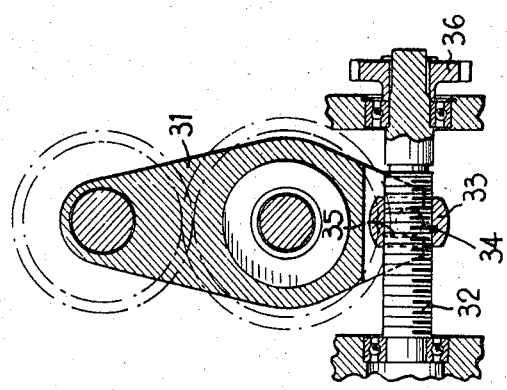
FIG. 3 is a sectional view taken along line 3—3 of FIG. 1.

When the conical discs 23 and the rings or annular discs 24 are coaxial, the speed of rotation of the socket 28 is the same as that of the shaft 22. On the other hand, when the discs 23 and rings 24 are no longer coaxial, the speed of the socket 28 becomes less than that of the shaft 22 and this difference increases as the eccentricity or offset between the discs and rings increases. Various means can be employed for achieving this offset. In the illustrated embodiment, the shaft 23 is supported by a rocker arm 31 (FIGS. 1 and 3) which is rotatably mounted on the shaft D. The angular movement of the rocker arm is controlled by a lead-screw 32 which shifts therealong a block 33 which is prevented from rotating and drives the rocker arm through two lugs 34 disposed in slots 35 in the rocker arm. The lead-screw 32 is driven by a gear 36 which is one of the elements of a control reducer (not shown), this gear being driven for example by an electric control motor.

The disc variator E, which is one of the important elements of the transmission, has certain features:

(a) The theoretical calculation of the radius of curvature at the level of the point of contact between the two cones shows that, for given dimensions, the radius of curvature of two surfaces at the point of contact is inversely proportional to cos α (α being the half-angle of the apex of the cone). For a constant input torque, everything else being equal, in particular if the coefficient of friction is assumed to be constant, the maximum Hertz pressure in the zone of contact can be written:

$$P = \text{Constant } x \sqrt{\frac{\sin \alpha}{r}\left(\frac{1}{r} - \frac{1}{R}\right)}$$

wherein $r$ and $R$ (FIG. 5) are respectively: $r$, the radius between the axis of the male disc 23 and the point of contact between the disc 23 and the ring 24; $R$, the radius between the axis of the ring 24 and the point of contact 23–24.

It can be seen that when $r$ decreases (when the eccentricity increases) $p$ increases and that moreover $p \rightarrow 0$ when $\alpha \rightarrow 90°$. It would therefore be of interest to give α a value close to 90°. But operational difficulties occur therein in the neighborhood of zero eccentricity due to the noticeable width of the swelling of the female cones.

The discs employed in accordance with the invention have the feature of not being conical. Their shape has been modified so as to give a very slightly spherical surface 36 to the male discs 23 and a corresponding or conjugate toric shape 37 to the female discs. These shapes make it possible to obtain a half-angle α of conicity which varies when the eccentricity varies. α increases and tends towards 90° as the eccentricity increases from zero (see the angles $\alpha^1$ and $\alpha^2$ in FIG. 5). This permits a reduction in the increase in $p$ when $r$ decreases and approaching the operational condition in which $p$ is constant.

Apart from the advantage of the reduction in the Hertz pressure, this arrangement of the spherical surface 36 and toric surface 37 enables oil to be partly expelled, giving a film of oil of minimum thickness on the surfaces in contact.

(b) This effect of the expulsion of the film can be still more accentuated if one of the surfaces of the cones in contact is metallized by the projection of a layer of a wear-resistant metal (for example molybdenum) having a thickness between, for example, 0.2 and 0.5 mm. The surface then has an appreciable roughness which partly "tears" the film of oil by localizing it in the cavities at the level of the projections, the layer of oil being minimum.

(c) In order to facilitate the positioning and to decrease the size of the critical zone in the neighborhood of zero eccentricity the male discs can have an outside diameter less than the maximum diameter of the "toric" beads or flanges of the female discs, the surface of contact remaining, however, appreciable for direct engagement (zero eccentricity).

The opeartion of the transmission will be quite clear. At low speeds, the converter produces a first gearing down which is multiplied by that of the variator E which is adjustable by adjustment of the position of the rocker arm 31. At higher speeds, the converter is by-passed.

For each operational speed there is a forward operation or travel or a reverse operation or travel depending on whether the clutch 13 or 14 is engaged.

Briefly, the transmission according to the invention has the following advantages:

The benefit of the flexibility of the hydrokinetic converter at low vehicle speeds.

Increased efficiency of the transmission at higher speeds owing to the locking of the converter.

The possibility of employing a single variator having a reduced gearing down range so that the overall efficiency of the transmission is improved.

Compactness for incorporation is a transverse drive unit with possibility of operation in the same oil as that employed in the engine.

Although a specific embodiment of the invention has been described, many modifications and changes may be made therein without departing from the scope of the invention as defined in the appended claims.

Having now described my invention, what I claim as new and desire to secure by Letters Patent is:

1. A transmission for an automobile vehicle or the like, said transmission comprising an input drive shaft, an output driven shaft and a hydrokinetic converter, and a variator affording a continuous variation of the transmission ratio interposed in series relation between the drive shaft and driven shaft, said variator having solid male discs which has a substantially conical shape interposed between female annular discs, and having means for adjustably positioning said conical discs eccentric with respect to the annular discs, the surfaces of contact of the discs being spherical on the solid male discs and having a conjugate toroidal shape on the female annular discs, an oil film between the male and the female discs, one of the surfaces of mutual contact between the discs including a sprayed layer of a wear-resistant metal having a rough surface so as to partly tear the oil film.

2. A transmission as claimed in claim 1, wherein one of the surfaces of mutual contact between the discs includes a sprayed layer of molybdenum having a rough surface so as to partly tear the oil film.

3. A transmission for an automobile vehicle or the like, said transmission comprising an input drive shaft, a hydrokinetic torque converter comprising a pump element and a turbine element which are rotatable about a first axis, said pump element being driven by said drive shaft about said first axis, an intermediate shaft rotatable about a second axis parallel to and distant from said first axis and having formed or fixed thereon three gears, means provided between said turbine element and first and second of said three gears for driving said intermediate shaft in either direction, and a continuous variation speed variator having an input shaft and an output driven shaft rotatable about a third axis parallel to and distant from said first and second axis, said input shaft having formed or fixed thereon an input gear meshed with the third of said three gears of the intermediate shaft.

4. A transmission for an automobile vehicle or the like, as claimed in claim 3, comprising a pump shell bodily connected to said pump element and surrounding said turbine element, said turbine element bearing on its external periphery facing said shell elastically yieldable friction pads having one end fixed to said turbine element and the other end of which is free and can move radially under the action of centrifugal force, whereby the two elements can be interconnected for a given speed of the turbine element.

5. A transmission for an automobile vehicle or the like, as claimed in claim 3, wherein said means comprise a gear train driven by said turbine, a shaft coaxial with the variator axis and driven by said gear train, a first freely rotatable gear mounted on said shaft, which directly meshes with first of said three gears, a second freely rotatable gear mounted on said shaft which meshes with an idler gear meshing with said second of said three gears, and clutch means for selectively solidarize in rotation one of said first and second freely rotatable gears and said shaft, thereby causing the intermediate shaft to rotate in either direction.

6. A transmission for an automobile vehicle or the like, as claimed as claim 3, wherein said continuous variation speed variator is of the disc type and comprises male discs having a substantially conical shape splined on said input shaft and interposed between female annular discs splined in a socket coaxial with and drivingly connected to said output shaft, spring means in said socket for urging said female rings into engagement with said male discs, said input shaft of the variator being journalled in a rocker arm rotatively mounted on said intermediate shaft, and means being provided for setting the angular position of said rocket arm about the intermediate shaft and thereby rendering said male discs eccentric or offset to a variable extent with respect to the female annular discs thus providing the speed variation.

7. A transmission for an automobile vehicle or the like, as claimed in claim 6, wherein said means for setting the angular position of said rocker arm about the intermediate shaft comprises a lead-screw having an axis transverse with respect to the axis of said input shaft, a nut-forming block screwthreadedly engaged on said lead-screw and which is prevented from rotating, said block being provided with two lugs slidably engaged in two slots of the rocker-arm, whereby the block can be shifted along the lead-screw and drive the rocker-arm.

8. A transmission for an automobile vehicle or the like, as claimed in claim 6, wherein the surfaces of contact of the discs are spherical on the solid male discs and have a conjugate toroidal shape on the female discs.

9. A transmission for an automobile vehicle or the like, as claimed in claim 6, wherein the female discs have toroidal flange portions and the male discs have an outside diameter which is less than the maximum diameter of the toroidal flange portions of the female discs.

10. A transmission for an automobile vehicle or the life, as claimed in claim 6, wherein one of the surfaces of mutual contact between the discs includes a sprayed layer of a wear-resistant metal having a rough surface so as to partly tear the oil film.

11. A speed variator for an automobile transmission or the like comprising: a pair of rotary discs having opposite faces, means mounting said discs for rotation about a first axis, a pair of rotary rings having opposite faces, means mounting said rings for rotation about a second axis, means urging at least one disc face into engagement with at least one ring face, and means for offsetting one of said axes laterally relative to the other axis, whereby the speed of rotation of said discs and said rings is adjusted, said disc faces having an outer spherical surface of contact and said ring faces having a conjugate toroidal surface of contact, an oil film between said surfaces of contact, one of said surfaces of contact including a sprayed layer of a wear-resistant metal providing a rough surface so as to partly tear the oil film.

12. A speed variator as claimed in claim 11, wherein said wear resistant metal is molybdenum.

13. A speed variator as claimed in claim 11 wherein said discs are mounted for rotating on a shaft, said rings are mounted for rotation on a shaft, means restricting rotation of said discs and rings relative to their respective shafts, one of said shafts being mounted for rotation about a fixed axis and said offsetting means being connected with the other of said shafts.

14. A speed variator as claimed in claim 11 wherein said offsetting means includes a rocker arm mounted for swinging movement about an axis parallel to said one shaft, said other shaft being journalled in said rocker arm, and means for adjusting the angular position of said rocker arm about said rocker arm axis to displace said discs eccentric to a variable extent with respect to said rings thus providing a speed variation.

15. A transmission as claimed in claim 10, wherein said wear-resistant metal is molybdenum.

References Cited
UNITED STATES PATENTS

| | | | |
|---|---|---|---|
| 2,743,621 | 5/1956 | Beier | 74—199 |
| 3,043,150 | 7/1962 | Skuba | 74—199 |
| 3,181,381 | 5/1965 | Jorgensen | 74—199 |
| 3,252,352 | 5/1966 | General et al. | 74—645 |
| 3,381,777 | 5/1968 | Flichy | 74—199X |
| 3,387,507 | 6/1968 | De Castelet | 74—796 |

ARTHUR T. McKEON, Primary Examiner

U.S. Cl. X.R.
74—796, 199